US008025571B2

(12) United States Patent
Cisneros et al.

(10) Patent No.: US 8,025,571 B2
(45) Date of Patent: Sep. 27, 2011

(54) TELEVISION INTERACTIVE GAMING HAVING LOCAL STORAGE OF GAME PORTAL

(75) Inventors: Shahla C. Cisneros, Coral Gables, FL (US); Peter Klimczak, Sunrise, FL (US); Steven M. Soloff, Tamarac, FL (US); Jesus F. Mata, Boca Raton, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 884 days.

(21) Appl. No.: 10/687,474

(22) Filed: Oct. 14, 2003

(65) Prior Publication Data

US 2004/0198495 A1      Oct. 7, 2004

(51) Int. Cl.
*G06F 17/00*     (2006.01)
(52) U.S. Cl. .............................. 463/42; 463/25; 463/40
(58) Field of Classification Search ............. 463/42, 463/40, 25; 705/11
See application file for complete search history.

(56) References Cited

U.S. PATENT DOCUMENTS

| | | | | |
|---|---|---|---|---|
| 5,638,113 A * | 6/1997 | Lappington et al. | ........... | 725/141 |
| 5,641,319 A * | 6/1997 | Stoel et al. | ........... | 463/42 |
| 5,675,828 A * | 10/1997 | Stoel et al. | ........... | 463/25 |
| 5,695,400 A * | 12/1997 | Fennell et al. | ........... | 463/42 |
| 5,734,413 A * | 3/1998 | Lappington et al. | ........... | 725/141 |
| 5,762,552 A * | 6/1998 | Vuong et al. | ........... | 463/25 |
| 5,779,549 A * | 7/1998 | Walker et al. | ........... | 463/42 |
| 5,907,715 A * | 5/1999 | Stoel et al. | ........... | 710/46 |
| 6,183,366 B1 * | 2/2001 | Goldberg et al. | ........... | 463/42 |
| 6,193,610 B1 * | 2/2001 | Junkin | ........... | 463/40 |
| 6,264,559 B1 * | 7/2001 | Lawrence et al. | ........... | 463/40 |
| 6,264,560 B1 * | 7/2001 | Goldberg et al. | ........... | 463/42 |
| 6,447,396 B1 * | 9/2002 | Galyean et al. | ........... | 463/40 |
| 6,468,155 B1 * | 10/2002 | Zucker et al. | ........... | 463/23 |
| 6,692,358 B2 * | 2/2004 | Lawrence et al. | ........... | 463/39 |
| 6,712,702 B2 * | 3/2004 | Goldberg et al. | ........... | 463/42 |
| 6,800,031 B2 * | 10/2004 | Di Cesare | ........... | 463/40 |
| 6,840,861 B2 * | 1/2005 | Jordan et al. | ........... | 463/42 |
| 6,863,612 B2 * | 3/2005 | Willis | ........... | 463/42 |
| 6,884,171 B2 * | 4/2005 | Eck et al. | ........... | 463/42 |
| 7,303,473 B2 * | 12/2007 | Rowe | ........... | 463/42 |

(Continued)

FOREIGN PATENT DOCUMENTS

GB       2422558 A  *  8/2006

(Continued)

OTHER PUBLICATIONS

Form 10-K☐☐NTN Communications Inc—NTN☐☐Filed: Mar. 6, 2002 (period: Dec. 31, 2001)☐☐Annual report which provides a comprehensive overview of the company for the past year.*

(Continued)

*Primary Examiner* — Melba Bumgarner
*Assistant Examiner* — Tramar Harper

(57) ABSTRACT

The present invention relates to a system and method for interactive gaming comprising: a central broadcast center (10) transmitting signals over a first communications network; a gaming system (25) residing within the central broadcast center (10); a plurality of users who access the gaming system (25) via the first communication network. The gaming system (25) provides a plurality of games that incorporate a scoring protocol that provides real time scoring data transmitting from the plurality of users back to the gaming system via a second communication network. The plurality of users may review the real time scoring data via the first communications network.

7 Claims, 15 Drawing Sheets

U.S. PATENT DOCUMENTS

| | | | |
|---|---|---|---|
| 2001/0034269 A1* | 10/2001 | Lawrence et al. | 463/40 |
| 2001/0036865 A1* | 11/2001 | Neal, III | 463/42 |
| 2002/0034980 A1* | 3/2002 | Lemmons et al. | 463/40 |
| 2002/0042293 A1* | 4/2002 | Ubale et al. | 463/9 |
| 2002/0042920 A1* | 4/2002 | Thomas et al. | 725/87 |
| 2002/0056136 A1* | 5/2002 | Wistendahl et al. | 725/135 |
| 2002/0119824 A1* | 8/2002 | Allen | 463/42 |
| 2002/0133817 A1* | 9/2002 | Markel | 725/23 |
| 2002/0142842 A1* | 10/2002 | Easley et al. | 463/42 |
| 2003/0171148 A1* | 9/2003 | Weitz | 463/40 |
| 2004/0039631 A1* | 2/2004 | Crockett et al. | 705/11 |
| 2004/0142742 A1* | 7/2004 | Schneider et al. | 463/25 |
| 2005/0015815 A1* | 1/2005 | Shoff et al. | 725/135 |
| 2007/0004516 A1* | 1/2007 | Jordan et al. | 463/42 |

FOREIGN PATENT DOCUMENTS

WO    WO03012624 A1 *  7/2001

OTHER PUBLICATIONS

Form 10K NTN Communications Inc-NTN Filed: Mar. 6, 2002 (period: Dec. 31, 2001) Annual report which provides a comprehensive overview of the company for the past year.*

Mexican Office Action dated Apr. 16, 2009 in Mexican Patent Application No. PA/a/2004/001966 filed Mar. 1, 2004 by Shala C. Cisneros et al.

* cited by examiner

TELEVISION INTERACTIVE GAMING HAVING LOCAL STORAGE OF GAME PORTAL

BACKGROUND OF THE INVENTION

1. Field of the Invention

The present invention relates to interactive gaming via a television system and communications network.

2. Description of Related Art

Interactive gaming provides entertainment for the general public in many forms, such as PC gaming, specific console formatted gaming and gaming via a communications network with a central server. Each form of interactive gaming presents various advantages and disadvantages. Some gaming allows a multitude of players access but may be subject to equipment specifications such as server limitations, connection speeds, internet service provider, broadband capabilities, video cards and/or peripheral equipment. Specific formatted gaming is limited to participants with direct access to the gaming console, i.e., Playstation, X-Box, and Gameboy. Gaming via a communication network may allow many users but is subject to the communication capabilities of each user and are limited to users who have access to the communication network. Frequently, users may lose their connection to the central gaming server due to various network problems. By using existing television systems for interactive gaming one may increase the potential market for interactive gaming and diminish some of the shortcomings associated with interactive gaming via a communication network. Other interactive television gaming systems include Bell ExpressVu in Canada and Visionik in Denmark. These interactive systems however lack flexible and effective user friendly functionality.

U.S. Pat. No. 6,193,610 to Junkin relates to an interactive apparatus and method that allows participants to compete in an interactive game occurring in real time or as a taped broadcast of a real time event. The interactive gaming of Junkin may be accomplished by accessing an online version of the game while the corresponding event airs live or is rebroadcast to the participant on a television. Junkin describes an interactive gaming scheme that allows the participants to select individuals and/or teams, who are engaged in an event being broadcast, from a contest roster database. The participants form a team from the roster database and scores are developed based upon the individual's and/or team's performance in the televised event. The interactive gaming of Junkin is specifically associated with the televised event and dependant upon its outcome. Junkin does not discuss or disclose methods of interactive gaming in an independent format where users actively control the outcome and strategy related to the game via the television system.

U.S. Pat. No. 6,227,974 to Eilat et al. relates to a gaming method for use with an interactive game that a player plays with a player unit having an interface device which is coupled to a television and to at least one communication network. Eilat describes a method which enables two players to engage in an interactive game via a television through a communication network. Eilat allows users to transmit their photos that are incorporated in the interactive game and allows the players play the game while viewing the game on their respective televisions. Eilat essentially describes interactive games for two participants who view the game on a television and other viewers may watch the interactive play. U.S. Pat. No. 6,447,396 to Galyean, III et al. (Galyean) relates to an interactive computer game with a television broadcast, where a central control establishes a large virtual environment in which viewers participate with characters either controlled or designed by them. The interactive game of Galyean allows users to directly control or influence characters within an active region with defined boundaries that encompass part of the virtual environment that is much less that the total environment.

SUMMARY OF THE INVENTION

The present invention relates to interactive gaming via a participant's television. In one exemplary embodiment, the interactive gaming involves a trivia game which consists of one or more levels of play, wherein each level presents participants with increasingly difficult questions. Participants answer multiple questions related to a predetermined subject such as entertainment, sports, science, culture, art and/or health. Upon completion of a game or skill level within a game, participants may submit their respective scores to a central database and registry at an Interactive Game Center (IGC), i.e. server, where the score is compared to scores submitted by other participants. The IGC tallies scores in real time and sends the results back to each participant's set-top box, thereby allowing the users to compete with other players within a predetermined region. Participants may periodically, i.e. upon completing a question or a skill level, quit or pause the game for any desired time period. Participants may execute the quit or pause function at any time during the game.

Subscribers to the present invention may play the game through a conventional television. Subscribers may compete with other subscribers in real time due to the real time updates provided through the IGC. The subscriber may view results that include the subscriber's ranking or standing among the group of participants within the particular game.

The present invention may use the DIRECTV Interactive programming via the DIRECTV satellite system. Advantageously, a broadcaster may generate revenue by charging subscribers for playing the game and sponsors for advertising. The present invention provides a new television interactive game that is more exciting and user friendly than prior art. Subscribers have an unlimited number of competitors who may reside any where in the world. Participants may submit their respective scores to the IGC for tallying and ranking, or participants may choose to merely play without submitting their scores.

The present invention includes a database of questions that reside within a set-top box where the database is refreshed every hour. Participants may compete in a particular game at any time. New games may be started at pre-determined periods of time, such as every one or two weeks. Each new set of questions may give rise to a new contest between the participants. The database of questions may be associated with different skill levels to ensure a challenging gaming experience for all participants.

Advantageously, participants may pause the game after any question and turn off the television or switch to other programming. Participants may then return to the game at any time. At a predetermined level or after all of the proffered questions have been asked, participants may submit their respective score to be compared with others. The database of questions includes a substantial volume of questions in order to avoid repetition and to maintain the participant's interest.

During each game, each question must be answered within a predetermined time period. A participant may achieve a higher score by answering questions as quickly as possible. In one exemplary embodiment, if the predetermined time period expires, then the participant cannot answer the question, or in an alternative embodiment, the participant may submit an answer after expiration of the predetermined time period simply to determine if the participant actually knew the correct answer. Other variations of the general question/answer game format include supplying answers immediately or not supplying answers until completion of predetermined segments. If the participants are not supplied with a correct answer, then the question or a related question may be used again for this participant.

Participants subscribe to the interactive gaming via their respective set-top box. The set-tip boxes permit multiple participants to subscribe through a single set-top box. In an alternative embodiment, some participants may play the interactive games without subscribing, however unsubscribed participants merely answer questions for entertainment purposes and may not directly and interactively compete with any other participants. Furthermore, several set-top boxes may be installed at a particular location enabling a team of participants to compete with other teams within a predetermined region.

In accordance with these and other objects which will become apparent hereinafter, the instant invention will now be described with particular reference to the accompanying drawings.

DETAILED DESCRIPTION

The present invention enables a dynamic interactive game platform for use with a conventional television system. The present invention allows multiple users to participate in an interactive game via a television system that allows user interaction, continuous real-time scoring, multiple achievement levels and unique scoring schemes. The scoring scheme associated with the present invention awards points for correct answers, correct answers within a pre-determined time period, bonus points for consecutive correct answers, weighted correct answers associated with each achievement level, and tallies the score in dynamic real time. The present invention accomplishes real time interaction through the use of a satellite television system and a central interactive gaming center.

Figure 1A:
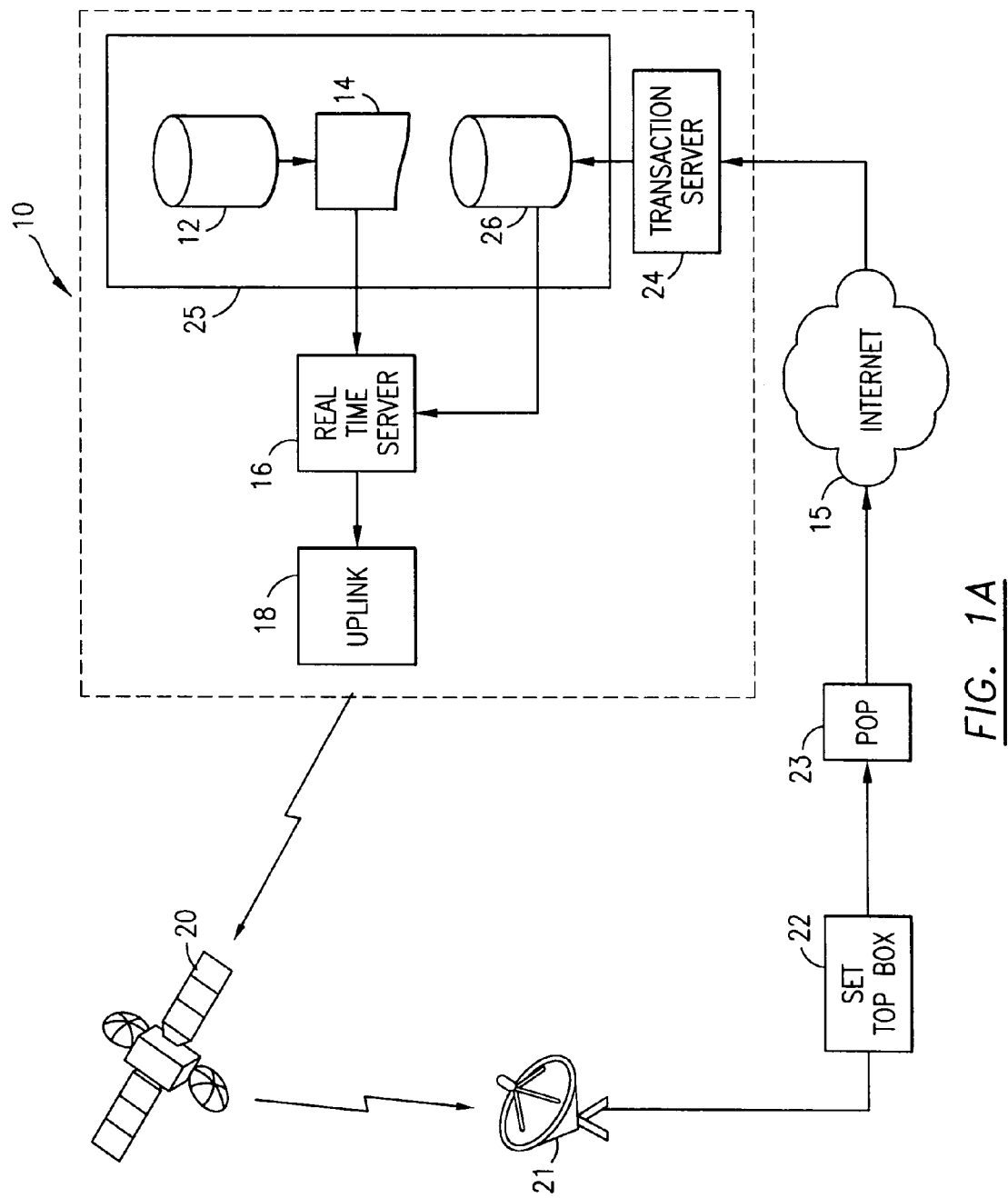
FIG. 1A shows an exemplary schematic diagram of a data flow according to the present invention.

A data flow for a system according to the present invention is shown in FIG. 1A. A gaming system 25 includes a question database 12 for use with a game application 14, such as an application for a trivia game. The gaming system 25 transmits data from the question database 12 and the trivia application 14 to a real-time update server 16. The update server 16 transmits data to an uplink server 18 that relays the data to a satellite 20. The satellite 20 then transmits the data from the question database 12 and/or game application 14 to a user's television STB 22. The questions and gaming application for playing the trivia game reside in the user's STB 22. The user may then interactively review the questions and provide answers via the STB 22. Questions are then asked and answers evaluated from the STB 22. A central broadcast center 10 includes, inter alia, the gaming system 25, the unlink server 18, the real time server 16 and transaction server 24.

In an exemplary embodiment, approximately 100 questions per level may be provided to a user periodically, i.e., hourly. The user, after playing the game may then submit their final score for a level or the entire game to a transaction server 24. The final scores are transmitted through a telephone from the STB 22 to the transaction server 24. However, other means for transmitting the final scores are conceivable, such as data including scores from several STBs 22 may be sent to the transaction server 24 for the game. As shown in FIG. 1A, data from the STB 22 is transferred via a modem to a point of presence (POP) 23 and then transmitted over the interne 15 to the transaction server 24.

From the transaction server 24, the data sent by the STBs 22 is placed in a high score database 26. The high score database 26 stores the scores from several users for comparison and ranking purposes. A list of high scores and other related data can then be transmitted back via the uplink server 18 to the user so that the user may see the user's score as compared with the other competitors. Data transmission may be provided through a real time update server 16 to an uplink server 18 and uplink server 18 then transmits a question packet from the question database 12 and the game application 14 to the STB 22. Based upon the data stored in the high score database 26, a prize may be sent to the user with the high score for a particular period such as two weeks, one month or year. The present invention also facilitates the ability to provide questions on different types of knowledge for various gaming contests.

In one exemplary embodiment, the question database 12 and the high score database 26 are stored in computer systems such as the Sun Ultra 5 having a Sparc 400 MHz processor and 256 MB of RAM, using the Solaris 8 operating environment and MySQL 3.53 database management software. The uplink server 18 may be a Sun Ultra 10 having a Sparc 400 MHz processor and 256 MB of RAM, using the Solaris 8 operating environment. The real-time update server 16 may be an HP NetServer LPr with a Pentium III 800 MHz processor, using Microsoft Windows 2000 Server operating system and the .NET platform. The transaction server 24 may be a Sun Blade 100 having a Sparc II 500 MHz processor. The RAM is preferred to be at least 512 MB and the computer may use the Sun Solaris 8 operating environment and Tomcat 4.1 Web Server software. The STB 22 may be a GLA 2.5 version using OpenTV EN 2.1 software for its applications. In one exemplary embodiment, the STB 22 has 2 MB of RAM and 3 MB of Flash memory. Equivalent software and hardware for the servers, databases and STBs may be substituted for the items described. Also, the question database 12 and the high score database 26 may be located in the same hardware system.

Figure 1B:
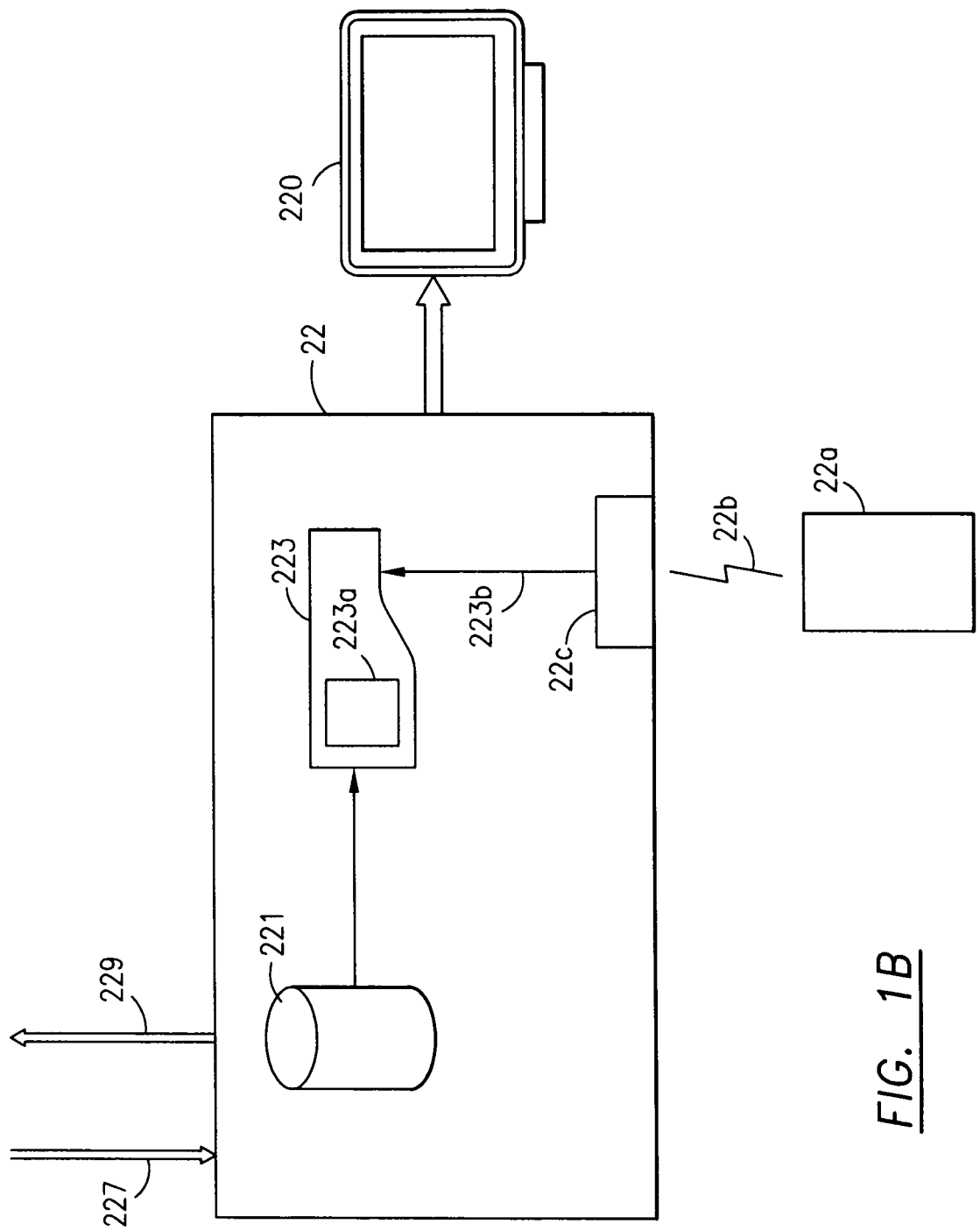
FIG. 1B shows an exemplary set top box configuration according to the present invention.

Referring now to FIG. 1B, a detail exemplary configuration for the STB 22 is shown. Data flows into and from the STB 22 via input 227 and output 229. A STB database 221 stores question packets sent to the STB 22 from the gaming system 25. The STB 22 also includes a gaming application 223 which executes the interactive gaming functionality for the user. The user interacts with the STB 22 via a handheld device 22a that transmits user commands to the STB 22 via a wireless transmission 22b. A user transmitter/receiver 22c receives the commands from the handheld device 22a and relays 223b these commands to the STB gaming application 223. The transmissions to and from the STB gaming application 223 include a question protocol to the television 220 and user replies, answers and commands, via the handheld device 11. The gaming application 223 includes applications which tally store a base score 223c and a bonus & time score 223d.

Figure 2A:
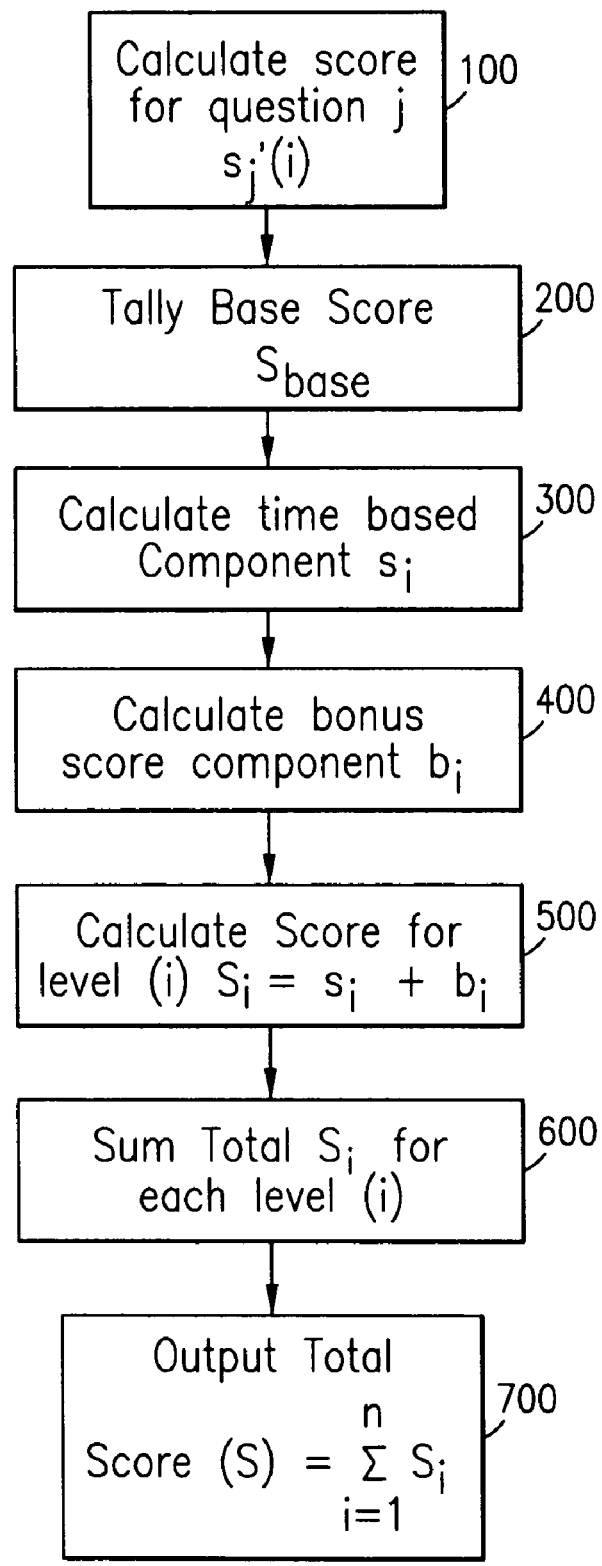
FIG. 2A shows a flowchart related to a scoring algorithm according to the present invention.
Figure 2B:
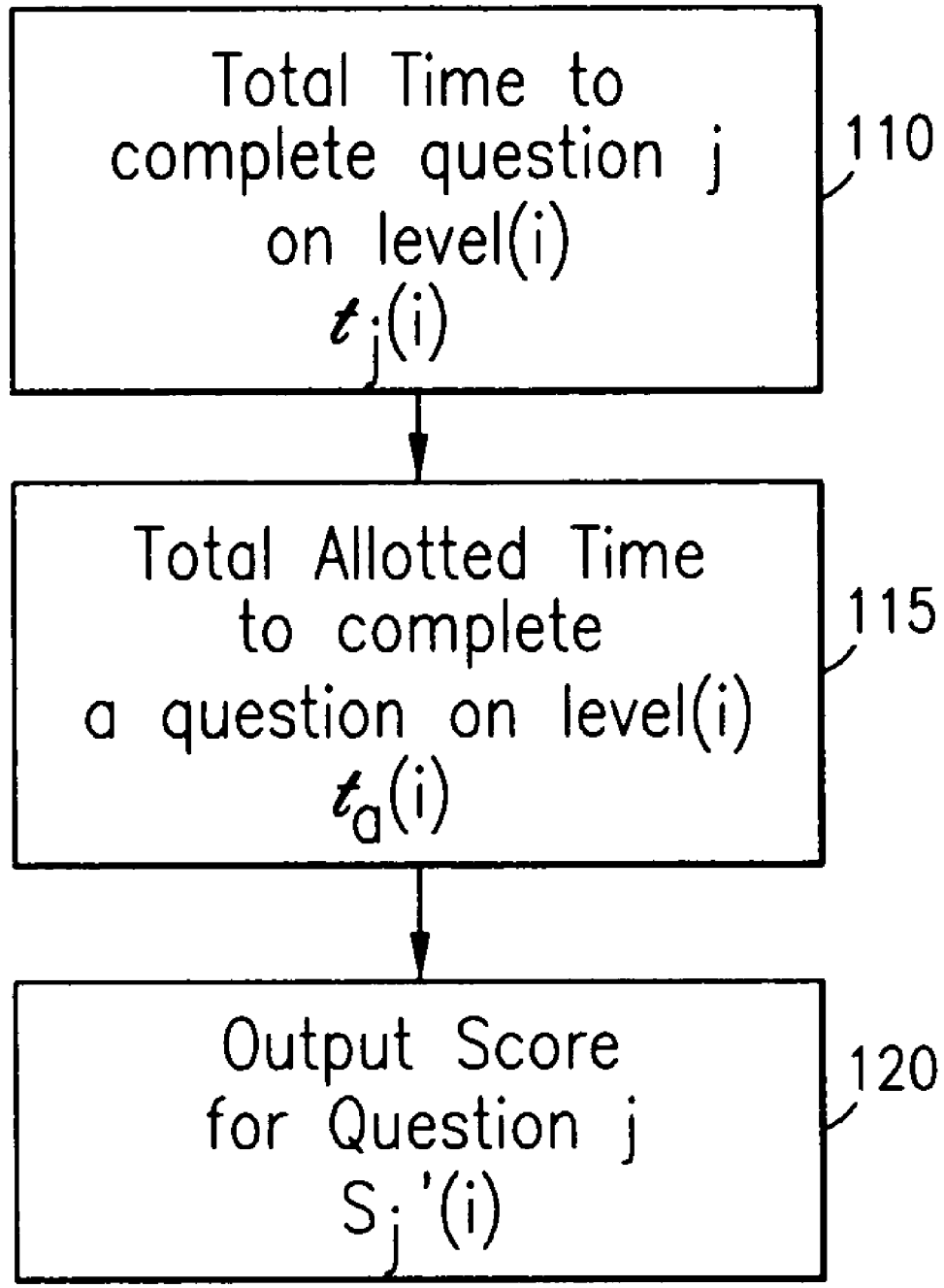
FIG. 2B shows a second flowchart related to the scoring algorithm according to the present invention.
Figure 2C:
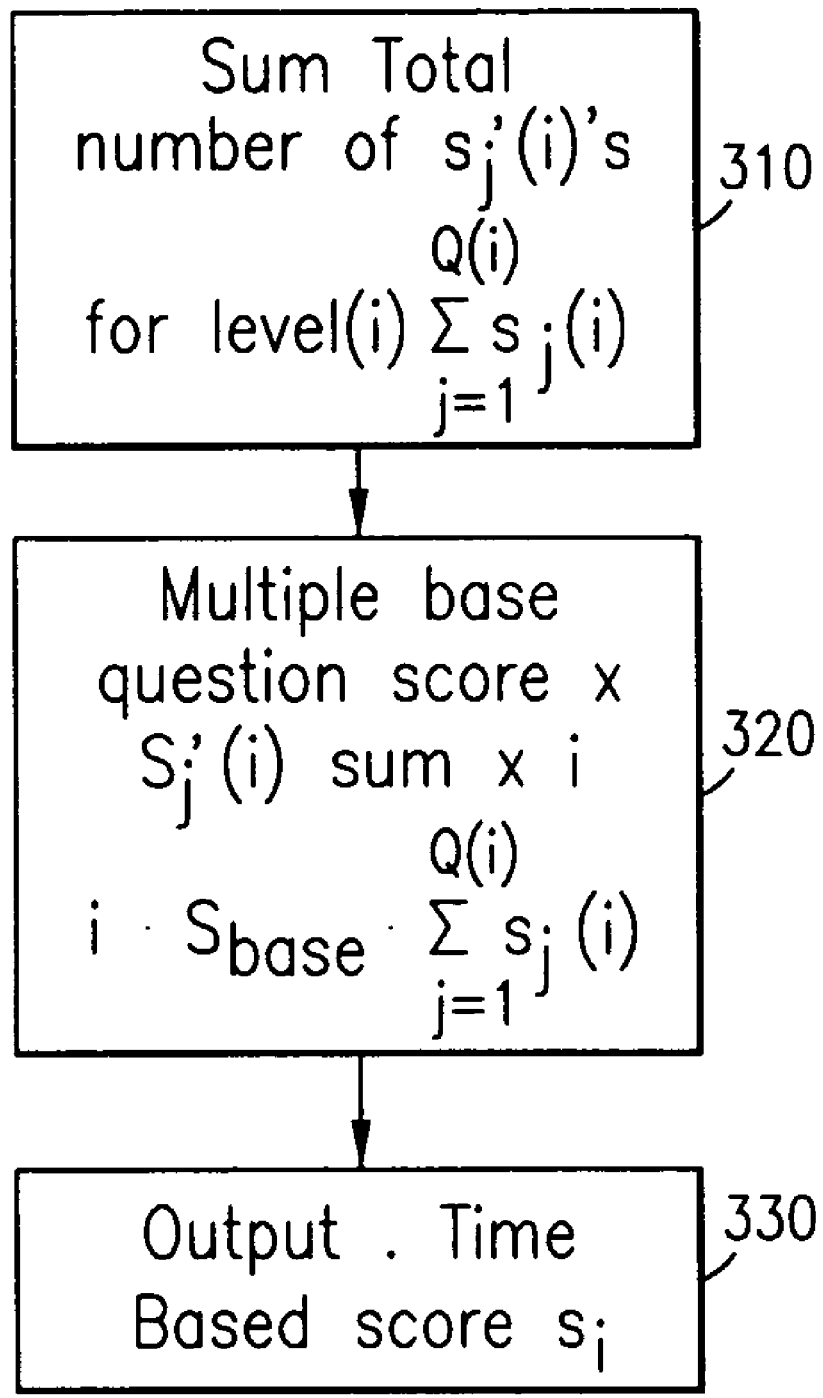
FIG. 2C shows a third flowchart related to the scoring algorithm according to the present invention.
Figure 2D:
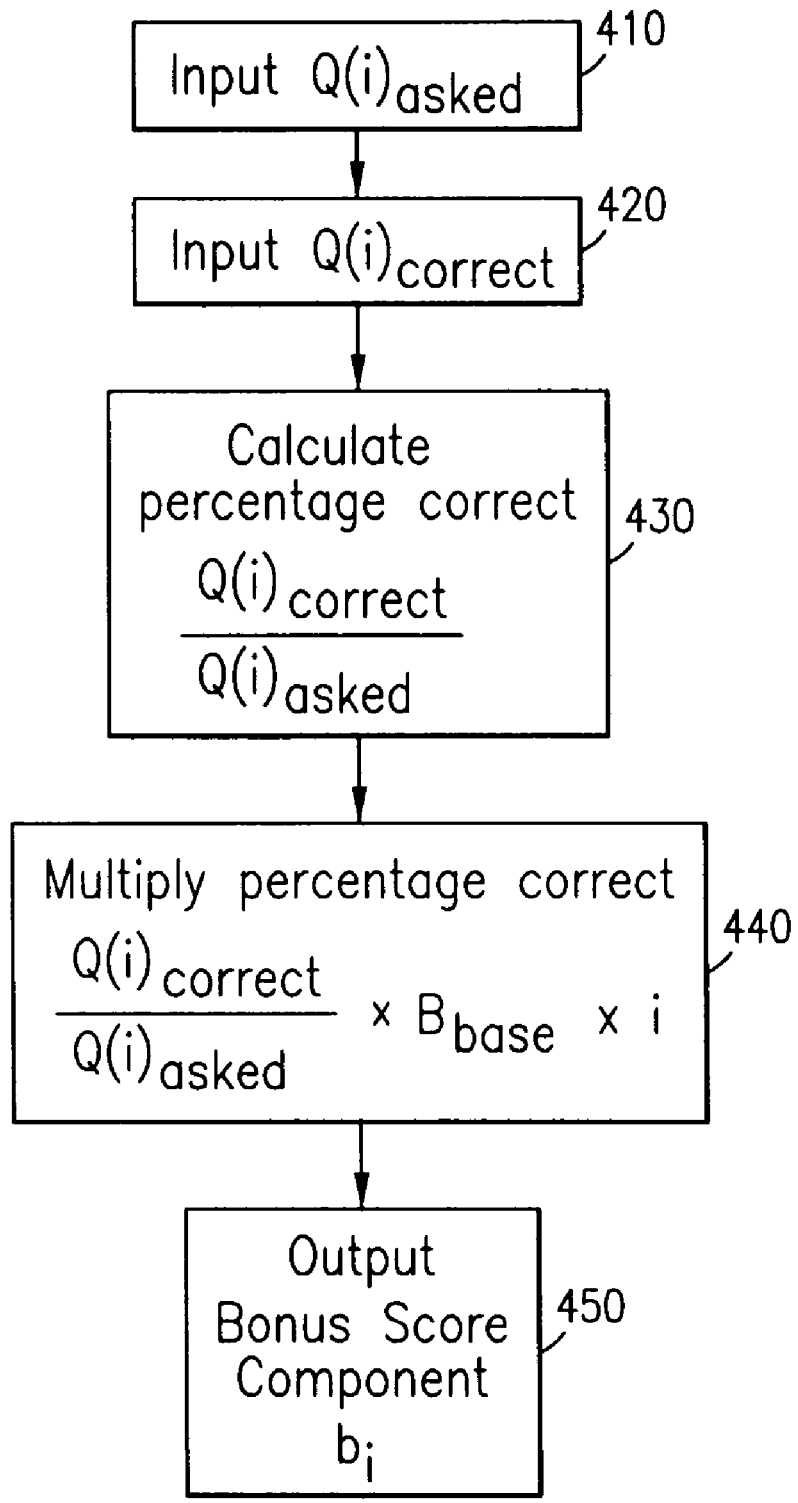
FIG. 2D shows a fourth flowchart related to the scoring algorithm according to the present invention.

Referring to FIG. 2A, an exemplary scoring algorithm is depicted. Initially, a score is calculated for a particular question as shown in step 100. The algorithm then tallies a base score, step 200, calculates time based component, step 300, calculates a bonus score component, step 400 and then calculates a score for the given level, step 500. To output the complete total score, the algorithm sums the score for each completed level and then outputs the sum as the total score for the particular user. FIGS. 2B through 2D show sublevels associated with the total score algorithm of FIG. 2A. Referring to FIG. 2B, the score for a particular question, step 100, includes: calculation of the total time to complete the question step 110; determination of the total time to complete a question on level (i); and using these two time components to determine the output score $s_j'(i)$ for a particular question, step 120, where $s_j'(i)=(t_a(i)-t_j/t_a(i))+\epsilon$, for correct answers only where $\epsilon$=a fudge factor. In calculating the time base score step 300, the algorithm provides a sum total of each score for all questions, step 310. The summation of the total scores is then multiplied by the tally base score and a level factor i, step 320. The result of the multiplication outputs a time base score at step 330 which is used in step 300 of FIG. 2A. The bonus score component step 400 of FIG. 2A is calculated according to the steps of FIG. 2D. Initially, an input of the total number of questions asked $Q(i)_{asked}$, step 410, is followed by an input of the total number of asked, questions correctly answered $Q(i)_{correct}$, step 420. A ratio is calculated in order to determine the percentage of correct answers. The correct percentage is then multiplied by the base level bonus score times the level factor i at step 440, then the bonus score component $b_j$ is output at step 450. As one may ascertain from the above algorithm, a user's score includes the number of correct answers, time associated in supplying the correct answers and an implementation of bonus scoring based thereon.

Figure 3:
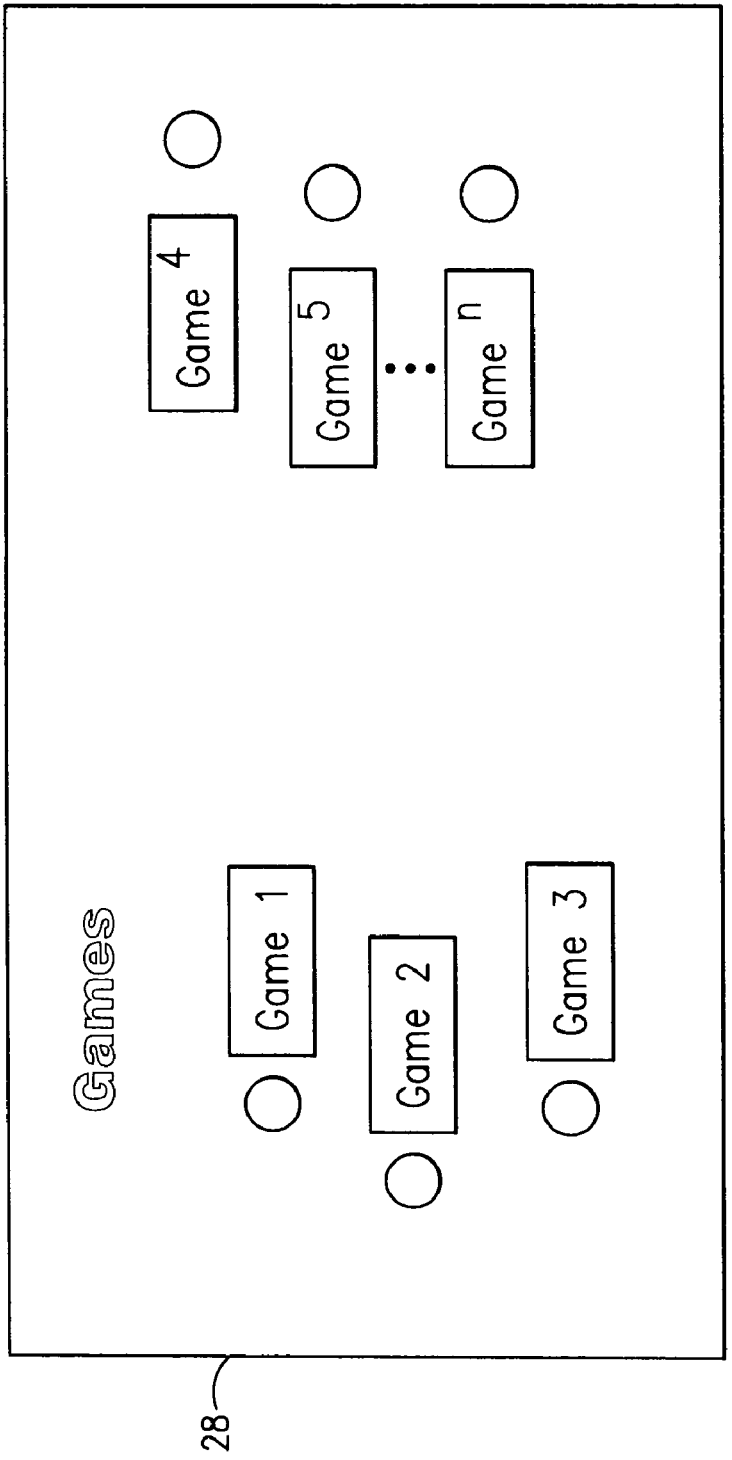
FIG. 3 shows an exemplary illustration of a portal screen of according to the present invention.
Figure 4:
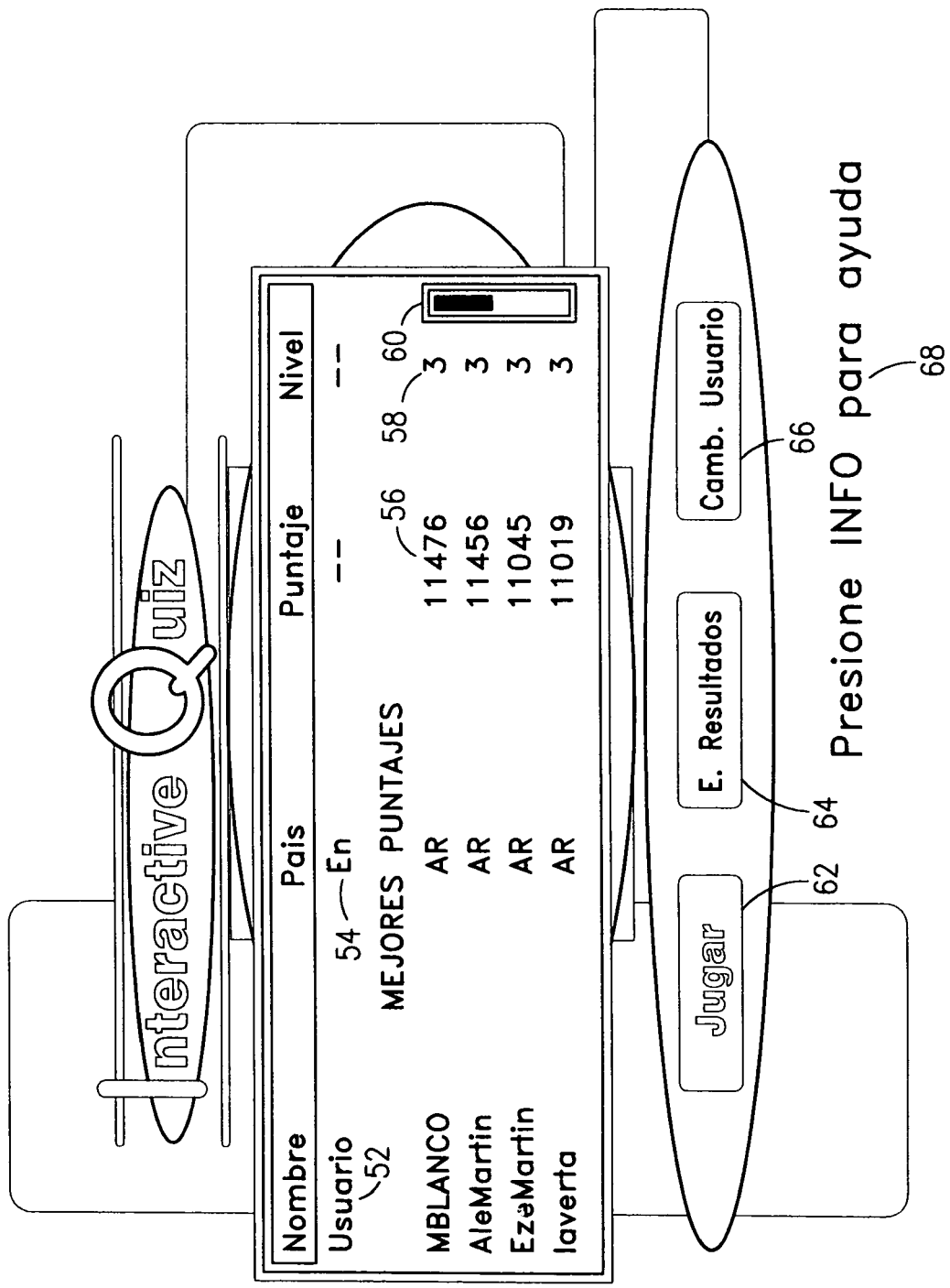
FIG. 4 shows an exemplary main game screen according to the present invention.

In one exemplary embodiment, the steps for playing the game are as follows. A portal screen 28 is provided, as shown in FIG. 3. The screen 28 allows the user to pick any of a number of games to be provided. Once the user selects a game, the user is brought to a main game screen 50 as shown in FIG. 4. The user enters a unique identifier 52 to play the game, where the identifier 52 is shown along with other information such as the location. On the initial screen, the points and level of play have not yet been recorded for the user. However, scores and rankings 56, 58 may be displayed for those who have already entered their score. Although a limited number of scores may be displayed on the screen, a scroll bar 60 may be used to display a longer list of scores. The main screen 50 allows the user to play 62, enter the results 64 or change the user identifier playing the game 66. The user is also given directions 68 regarding the game.

Figure 5:
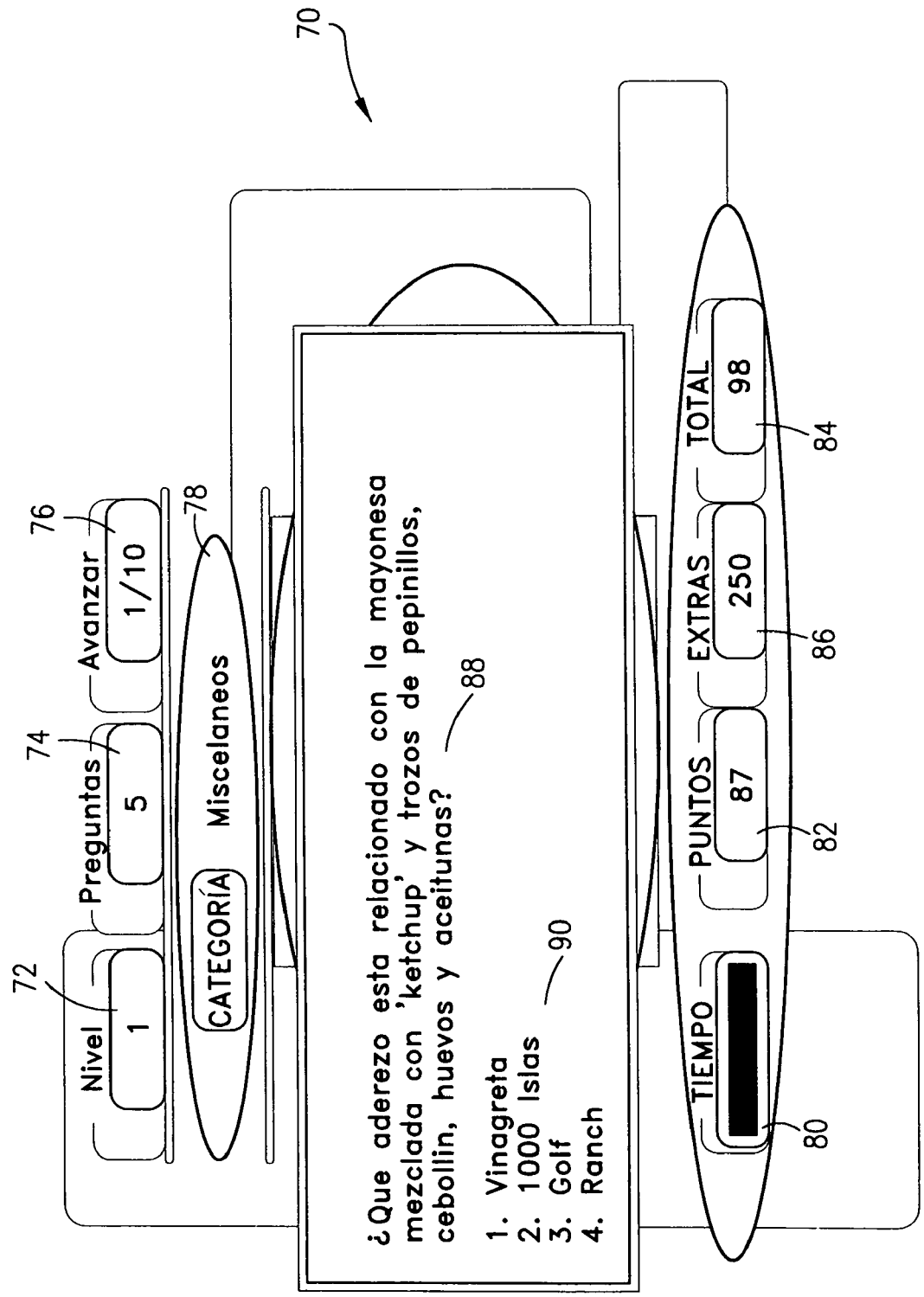
FIG. 5 shows an exemplary question screen according to the present invention.

After the user elects to play a particular game, the game begins with a question screen 70 as shown in FIG. 5. As shown, the question screen 70 provides information which the user may use for competing in the game. As shown, data for the user includes level of play 72, the number of questions asked for the level played 74, number of correct answers toward the number needed to advance to the next level 76, question category 78, time remaining to answer 80, points awarded for a rapid answer 82 and total points accumulated so far 84. Extra points may be awarded based upon the percentage of correct answers answered previously for the level being played and upon the level of play. The display of these extra points 86 is also shown on the question screen 70. Also on the question screen 70 are the question 88 and the answer choices 90. As shown, the number of right answers required per level is ten.

Figure 6:
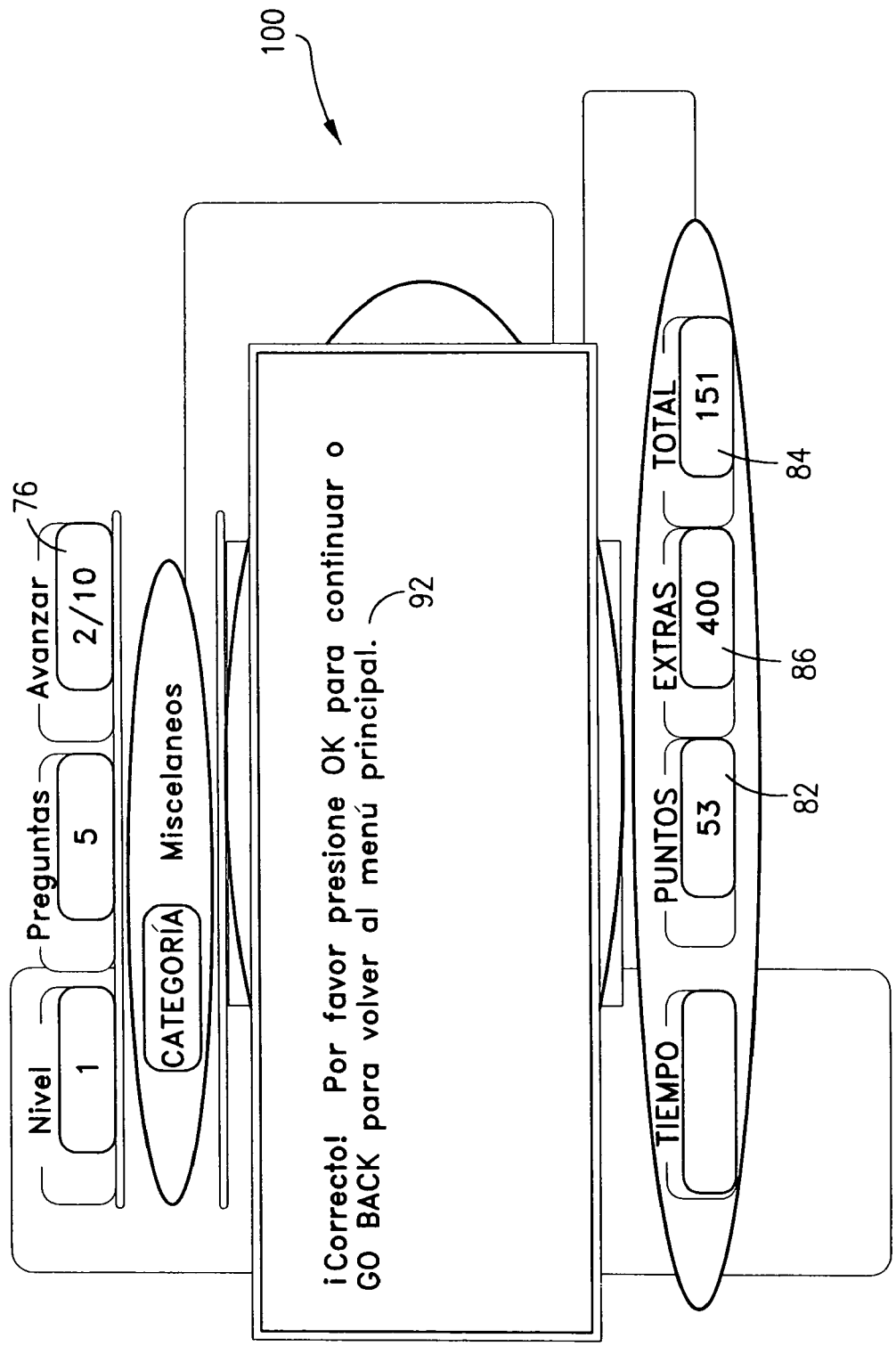
FIG. 6 shows an exemplary correct answer screen according to the present invention.

If the user correctly answers the question in the allotted time, a correct answer screen is provided 100, as shown in FIG. 6. The number of correct answers 76 is incremented as well as the points awarded 82 and the total points received 84. In addition, the amount of extra points 86 earned is incremented for the higher ratio of correct answers to questions asked. A message 92 informs the user that the answer is correct and offers the user the choice of moving forward or going back to the main menu.

Figure 7:
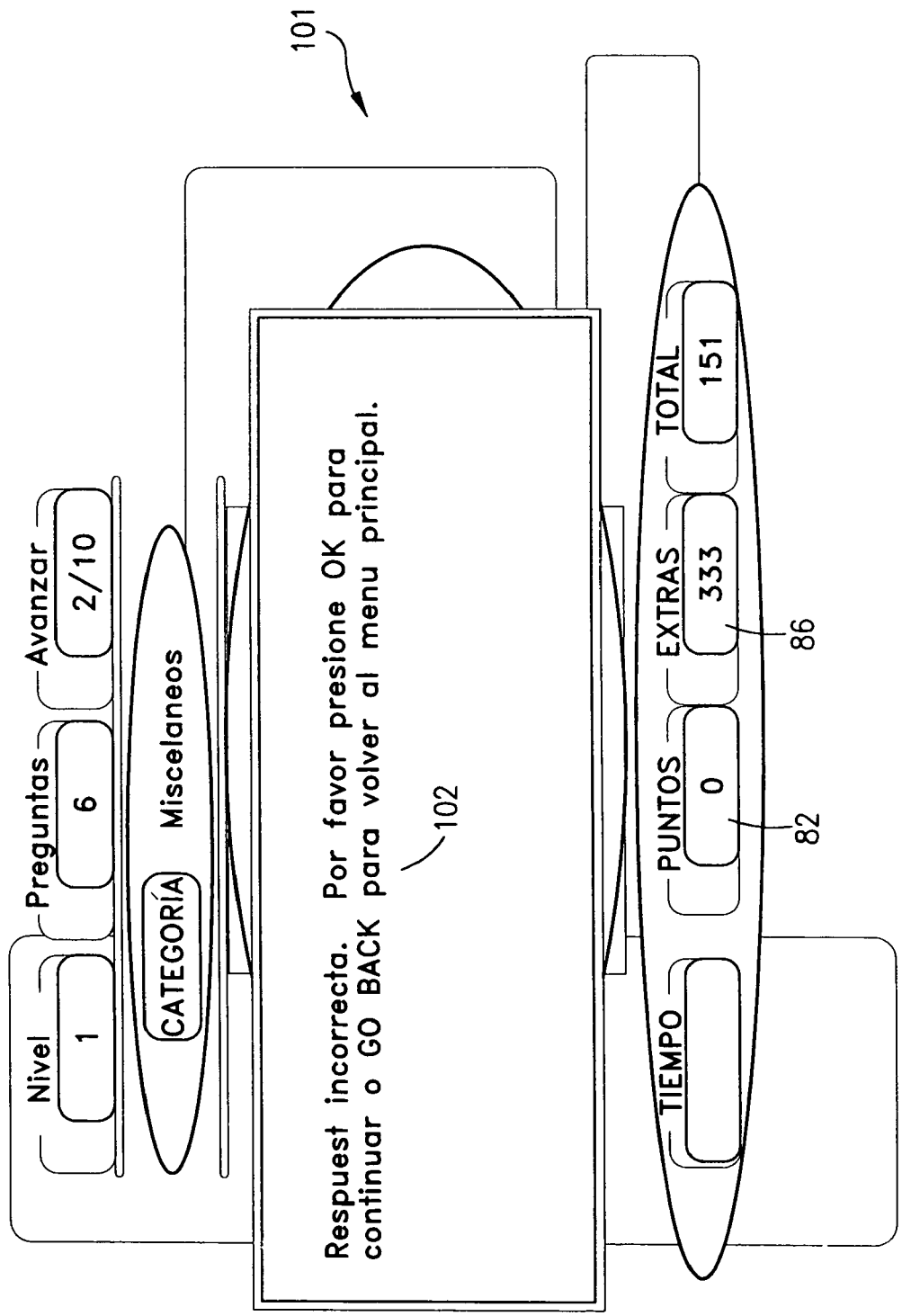
FIG. 7 shows an exemplary incorrect answer screen according to the present invention.

If an incorrect answer is given, or time runs out, an incorrect answer screen 101 is provided as shown in FIG. 7. In the incorrect answer screen 101, the number of points 82 awarded is shown to be zero, and the extra points 86 to be awarded is diminished because the ratio of correct answers to answers given has been lowered. A message 102 is provided which informs the user that the answer is wrong. In addition, the message 102 offers the user the choice of moving forward or going back to the main menu.

Figure 8:
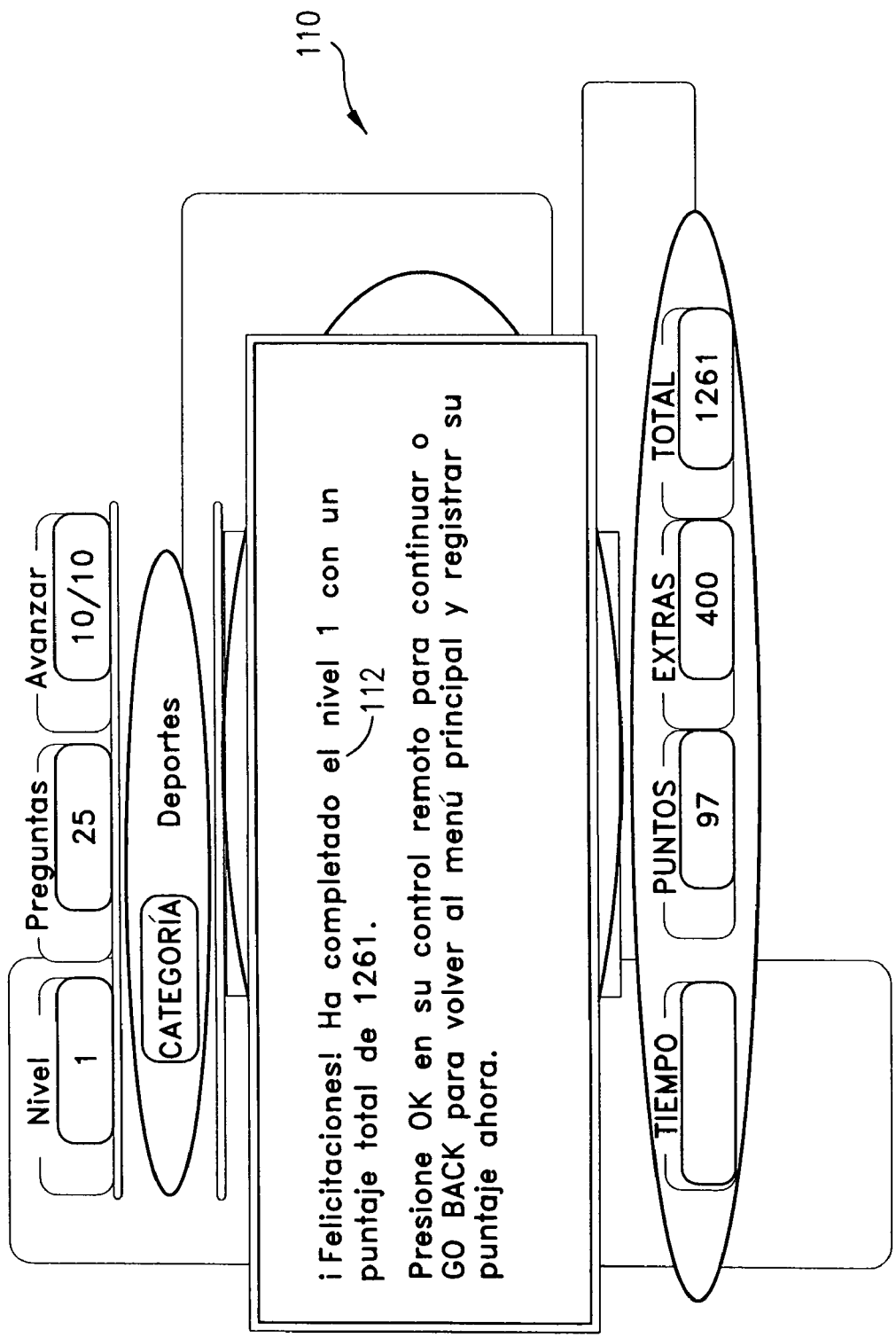
FIG. 8 shows an exemplary level completion screen according to the present invention.
Figure 9:
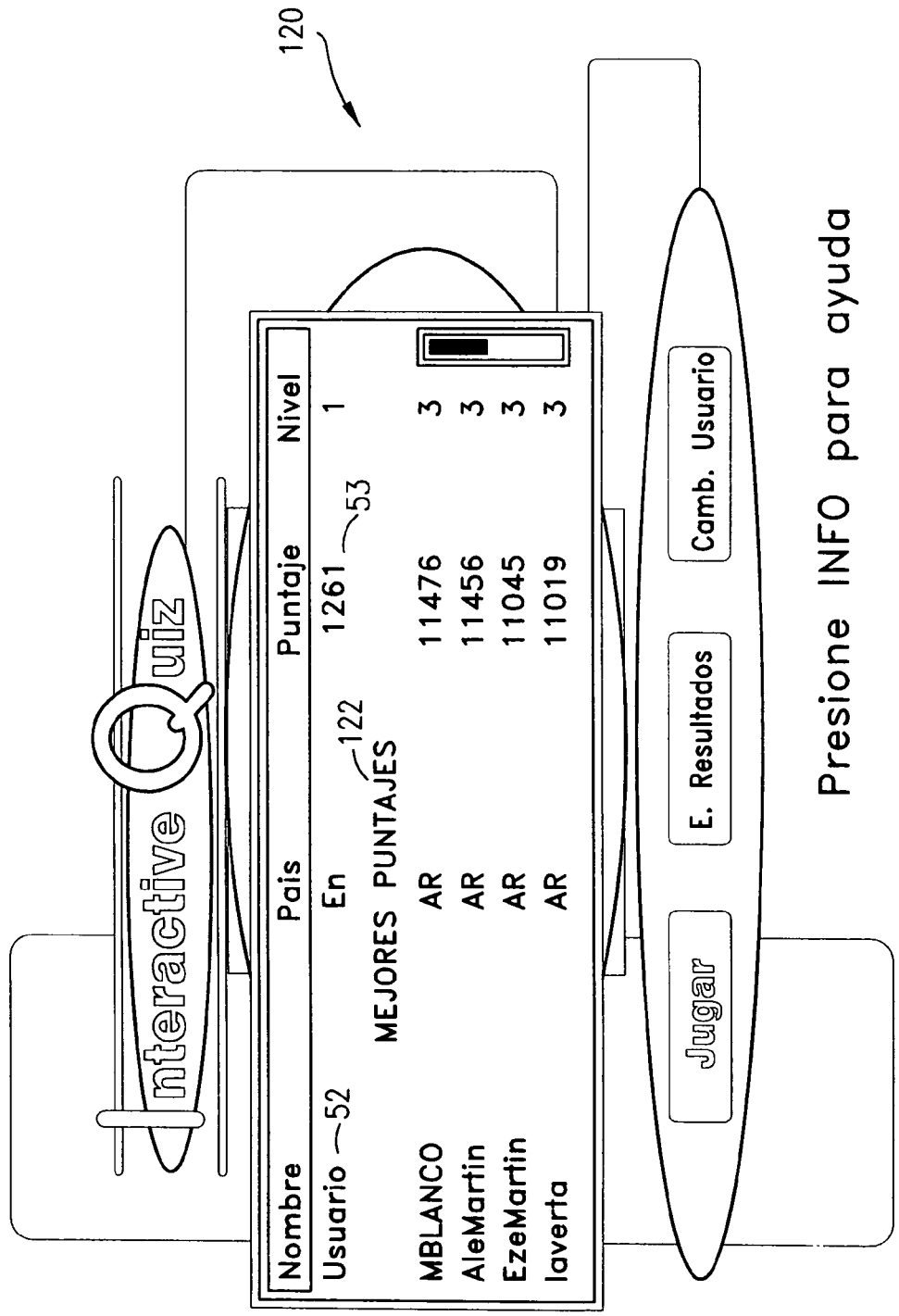
FIG. 9 shows an exemplary a score registration screen according to the present invention.

After the number of answers needed to advance to the next level is obtained, a level completion screen 110 is provided as shown in FIG. 8. A message 112 is provided informing the user, and a choice may be provided to continue to the next level or return to the main menu. If the user returns to the main menu, the user may elect to submit score results to the transaction server 24. The score registration screen 120 shown at FIG. 9 is provided if the user submits a score. As shown, the user's identifying information 52 and level score 53 is provided on the level completion screen. A high score roster 122 is also provided. In the roster, the high score list for the game currently residing in players' STBs is provided to all users. This high score list is updated throughout the residency of the game in the STBs. If an individual user makes one of the high scores for the game, then the user's name is added to the roster. The user's data is sent to the high score database 26 which is transmitted to the real-time update server and then transmitted to the respective STB for each user.

The user's score may be visible for a level or the game presented on the television almost instantly upon registration of the score. A portion of this information may be given, or additional information may be given, depending upon what type of game is provided. For example, the game may be based upon math or geography or any other field of knowledge. Appropriate information may be provided to make each type of game interesting.

Figure 10A:
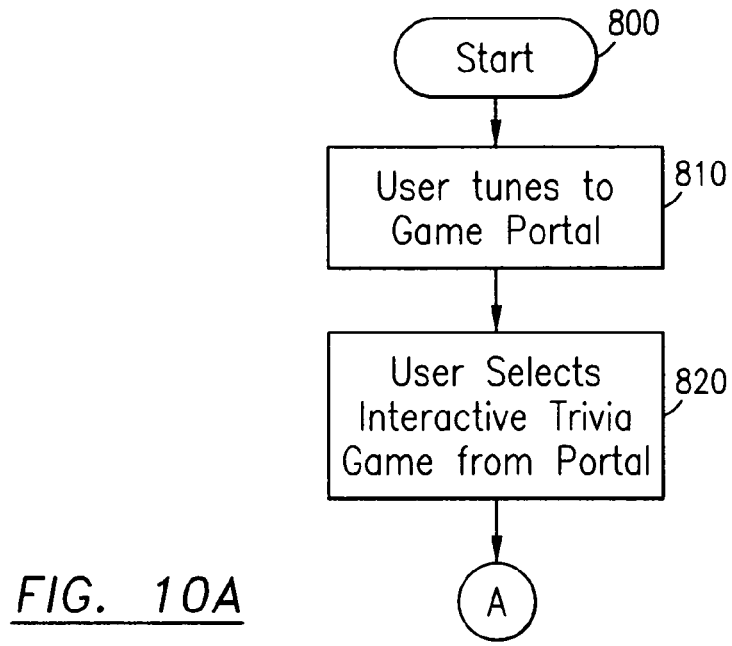
FIG. 10A shows a flowchart related to a gaming sequence according to the present invention.
Figure 10B:
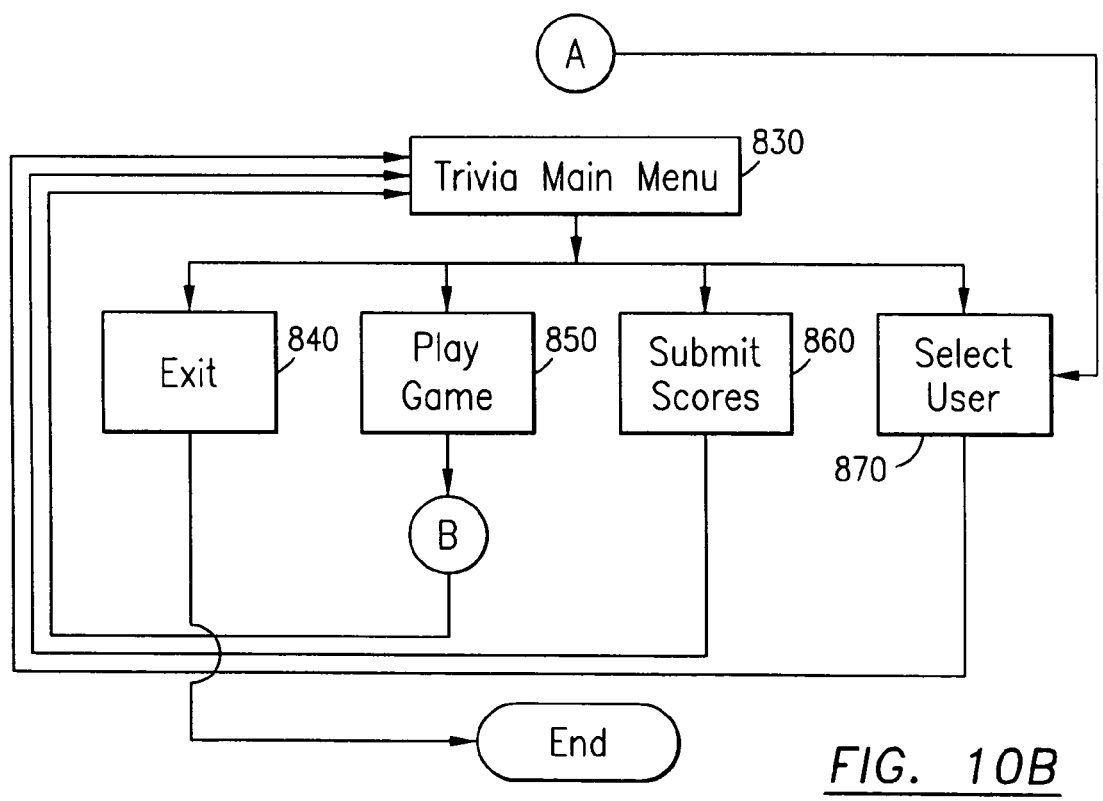
FIG. 10B shows the further steps of the flowchart related to the gaming sequence according to the present invention.
Figure 10C:
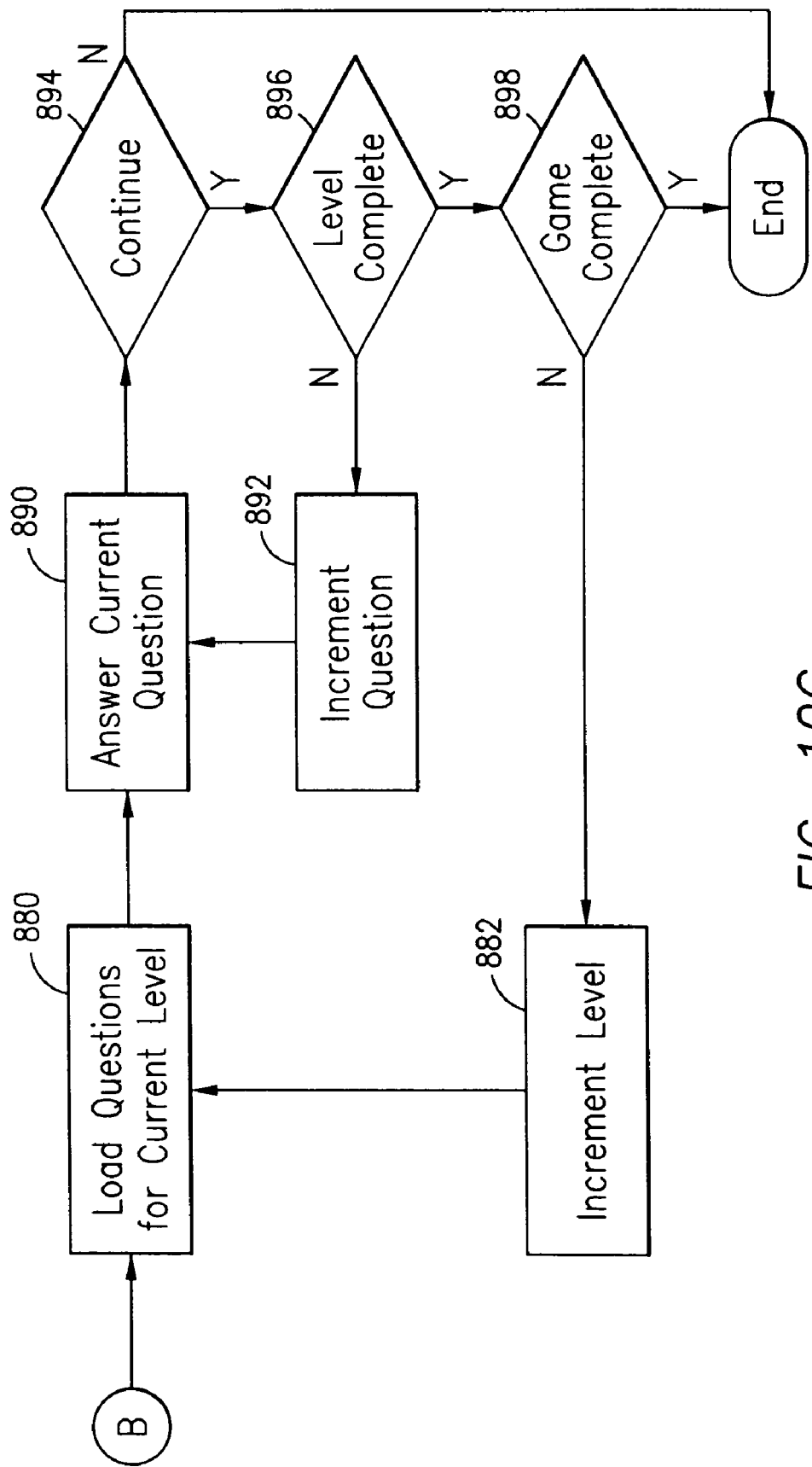
FIG. 10C shows the further steps of the flowchart related to the gaming sequence according to the present invention.

FIGS. 10A and 10B show a flow chart which sets forth the steps for interactive gaming according to the present invention. Initially, a user tunes to the game portal via the set top box, step 810 and selects the interactive trivia game from the game portal, step 820. Upon selection of the trivia game, the user inputs a user id, step 870. The trivia game allows multiple users to play the game via a single set top box. After the initial selection of a user, the trivia game's main menu appears, step 830. The user may choose four options while on the main menu exit the game, step 840, play the game step 850, submit scores 860 or select another user 870. If the user chooses to play the trivia game 850, then the game sequence is initiated as shown in FIG. 10C. The questions as sent from the gaming system 25 are uploaded for the current level, step 880. The user begins the game by answering the current question 890 and then continues to the next question and/or next level if the user has completed the current level questions. The user may also opt to end the game at any time after the complete of a question. So the user answers the current question 890 and decides whether to continue 894. The gaming application 223 determines if the level is complete 896 based upon the number of correct answers supplied by the user and notifies the user. Next the gaming application 223 determines if the game has been played through completion, step 898, if not then the trivia engine 223a increments the user to the next level 882 or alternatively if the game is complete the game ends. Upon incrementing to the next level trivia game cycles back to step 880 and the user views and answers the current question, step 890.

Further aspects of the interactive game include a three level game that may be played at one or more levels, where the point score equals zero, and the maximum score equals 12,000. Users must provide ten correct answers to advance to the next level. The score for each level has two components: (1) one component is based upon how quickly the correct answer is provided; and (2) the other component is based upon how many questions are required to get the required ten correct answers.

Each question has a base value equal to 100 times the level of the question. When presented with a question, the user will have a predetermined period of time to answer the question, such as 30 seconds times the level of the question. The more time a user uses to input a right answer, the fewer points received. A visual indicator shows the time and available points ticking down. If the points available drops to zero, the user can no longer answer the question and the user must move on to the next question to keep playing.

The first score component for a level is calculated by summing up the score of each correctly answered question and multiplying it by 100 times the level. The second score component for a level is calculated by multiplying 100 times the level by the ratio of number of questions answered correctly over the number of questions asked in total. Preferably, the points available are provided to the user in real time. Thus, a diminishing progress bar tells the user the points available if the answer is given instantaneously. The progress bar starts at 100% and drops incrementally to 0%. Color change for the time bar as the time lapses is also preferred. The second score component of the score for completing the level is updated after each question is answered. The cumulative score is updated after each question is answered. Other scoring methods are contemplated, such as eliminating the time factor in scoring or giving more value to the time factor.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of interactive gaming comprising:
   transmitting a gaming application from a gaming system to a plurality of receivers via a first communications network, and storing the gaming application at the receiver, wherein each receiver in the plurality of receivers allows for a plurality of users to use the gaming application;
   selecting a game from a plurality of games in the gaming system, wherein each game in the plurality of games is playable from a beginning of the selected game at the time of selection, the time of selection being after a time of transmission;
   initiating the beginning of a game selected from the plurality of games from the gaming application at a time after a time of transmission of the gaming application;
   submitting a user identification;
   generating a plurality of questions per skill level;
   initiating a question answer sequence;
   incrementing through the plurality of questions while progressing through the question answer sequence;
   incrementing each skill level upon completion of the question answer sequence for the plurality of questions;
   calculating a time based score component for each skill level;
   calculating a bonus score component for each skill level based on consecutive correct answers;
   summing the time based score component and the bonus score component in order to determine a total level score for each skill level;
   calculating a real time total user score associated with results of the question answer sequence by summing the total level score for each skill level completed by each user;
   transmitting the real time total user score to the gaming system via a second communications network; and
   transmitting a ranking of real time total user scores to each user via the first communications network.

2. The method of interactive gaming according claim 1, where the step of, calculating the time base score component, includes the steps of:
   recording a total time to submit an answer to a question of the plurality of questions;
   calculating an output score for said question based upon a ratio of the total time to submit an answer over a total time allotted to compete a question on the respective skill level;
   summing the output scores for each question of the plurality of questions and outputting a question sum total; and
   multiplying a question sum total times a skill level factor times a base question score.

3. The method of interactive gaming according to claim 1, where the step of, calculating the bonus score component, includes the steps of:
   incrementing a total number of questions asked $Q(i)_{asked}$ by 1 for each iteration of the question answer sequence;
   incrementing a total number of questions correct $Q(i)_{correct}$ by 1 for each correct answer supplied by the user;
   calculating a percentage correct based upon the ratio of $Q(i)_{correct}$ over $Q(i)_{asked}$;
   multiplying the percentage correct time a skill level factor times a base level bonus.

4. The method of interactive gaming according claim 1, where the step of, initiating the game, includes the steps of:
- initiating communication with a gaming portal over the communications network;
- selecting a game from a plurality of games accessible through the gaming portal; and
- transmitting a gaming application and a database of questions associated with the gaming application.

5. The method of interactive gaming according claim 1, where the step of, generating the plurality of questions, includes the steps of:
- collecting and selectively storing a plurality of system questions on a question database residing on the gaming system where step of selectively storing includes
- associating each question of said plurality of system questions with a skill level for a gaming application; and
- transmitting a portion of said plurality of system questions to a user upon request.

6. The method of interactive gaming according claim 1, where the step of, initiating the question answer sequence, includes the steps of:
- activating a gaming application residing on a user controlled device;
- reviewing a question on a user output device; and
- inputting an answer using a user input device.

7. The method of interactive gaming according to claim 1, further including the steps of:
- maintaining a question database within the gaming system;
- supplementing the question database with new questions; and
- constantly receiving new questions for completing the step of supplementing the question database.

* * * * *